United States Patent
Kalyan et al.

(10) Patent No.: US 10,037,705 B1
(45) Date of Patent: Jul. 31, 2018

(54) AIR TRAFFIC CONTROL FLIGHT MANAGEMENT

(71) Applicant: Honeywell International Inc., Morris Plains, NJ (US)

(72) Inventors: Vivek Kalyan, Bangalore (IN); Ankita Sinha, Bangalore (IN); John Joyson, Reading (GB); Andrea Antonini, Dubai (AE); Maksood Kadike, Dubai (AE); Dinesh Ramalingam, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/422,207

(22) Filed: Feb. 1, 2017

(51) Int. Cl.
*G08G 5/00* (2006.01)
*G08G 5/06* (2006.01)
*G06F 3/0482* (2013.01)
*G06F 3/0484* (2013.01)

(52) U.S. Cl.
CPC ......... *G08G 5/0043* (2013.01); *G08G 5/0026* (2013.01); *G08G 5/06* (2013.01); *G06F 3/0482* (2013.01); *G06F 3/04847* (2013.01)

(58) Field of Classification Search
CPC ...... G08G 5/0043; G08G 5/0026; G08G 5/06; G08G 5/003; G08G 5/04; G08G 5/0082; G08G 5/00; G08G 5/0034; G08G 7/00; G06F 3/00; G06F 19/00
USPC .......... 340/539.11, 539.13, 384.7, 5.61, 989, 340/993, 994, 995.13; 364/148, 439, 364/443; 701/3, 14, 120, 208
See application file for complete search history.

(56) References Cited

U.S. PATENT DOCUMENTS

| | | | |
|---|---|---|---|
| 5,659,475 A | * | 8/1997 | Brown ................ G08G 5/0026 701/120 |
| 5,764,508 A | * | 6/1998 | Harper .................. G06K 17/00 235/449 |
| 6,020,831 A | | 2/2000 | Nishida et al. |
| 6,912,461 B2 | | 6/2005 | Poreda |
| 9,171,476 B2 | | 10/2015 | White et al. |

(Continued)

FOREIGN PATENT DOCUMENTS

| | | |
|---|---|---|
| WO | 2007048237 A1 | 5/2007 |
| WO | 2012110046 A1 | 8/2012 |

OTHER PUBLICATIONS

"Traffic Management Advisor", National Aeronautics and Space Administration, https://www.aviationsystemsdivision.arc.nasa.gov/research/foundations/tma.shtml, Feb. 8, 2016, 16 pp.

(Continued)

*Primary Examiner* — Hung T Nguyen
(74) *Attorney, Agent, or Firm* — Brooks, Cameron & Huebsch, PLLC

(57) ABSTRACT

Methods, devices, and systems for air traffic control flight management are described herein. One device includes a memory, and a processor to execute executable instructions stored in the memory to receive airport information associated with an airport, generate, using the airport information, a card panel including a number of flight cards, wherein each respective one of the number of flight cards corresponds to a different respective aircraft at the airport, and a user interface configured to display the card panel in a timeline view in a single integrated display.

20 Claims, 9 Drawing Sheets

(56) References Cited

U.S. PATENT DOCUMENTS

| | | |
|---|---|---|
| 2009/0118997 A1 | 5/2009 | Truitt |
| 2009/0143968 A1 | 6/2009 | Truitt |
| 2014/0309821 A1* | 10/2014 | Poux .................... G08G 5/0021 |
| | | 701/14 |
| 2015/0339932 A1* | 11/2015 | Ramanna ............. G08G 5/0013 |
| | | 701/528 |
| 2016/0086496 A1 | 3/2016 | Resnick et al. |
| 2016/0093222 A1* | 3/2016 | Hale .................... G08G 5/0039 |
| | | 701/120 |

OTHER PUBLICATIONS

Eurocontrol: "Eurocontrol ITWP HMI Description", European Organisation for the Safety of Air Navigation, URL: https://www.eurocontrol.int/sites/default/files/publication/files/itwp-hmi-description-v4-20012017.pdf, Jan. 20, 2017 (188 pages).

* cited by examiner

US 10,037,705 B1

AIR TRAFFIC CONTROL FLIGHT MANAGEMENT

TECHNICAL FIELD

The present disclosure relates to methods, devices, and systems for air traffic control flight management.

BACKGROUND

Air traffic control (ATC) at an airport can direct aircraft on the ground and aircraft in airspace near the airport, as well as provide advisory services to other aircraft in airspace not controlled by ATC at the airport. Directing aircraft on the ground and in the air can prevent collisions between aircraft, organize and expedite aircraft traffic, and provide information and/or support for aircraft pilots.

ATC can use many different technologies in directing aircraft. For example, ATC can use paper flight strips that record flight movements and the corresponding tasks for those flight movements. As another example, ATC can use different displays and/or user interfaces that can show an ATC controller information including ground radar, air radar, weather information, etc.

ATC may need to direct many aircraft in and around the airport. To direct these aircraft safely and efficiently, ATC controllers may need to utilize many different displays and/or user interfaces. For instance, an ATC controller may need to utilize many different displays and/or user interfaces to determine information regarding different aircraft, prioritize those aircraft, and take actions to safely and efficiently direct those aircraft. Having to utilize many different displays can be challenging, leading to safety issues and delays for passengers and/or airlines.

DETAILED DESCRIPTION

Figure 1:
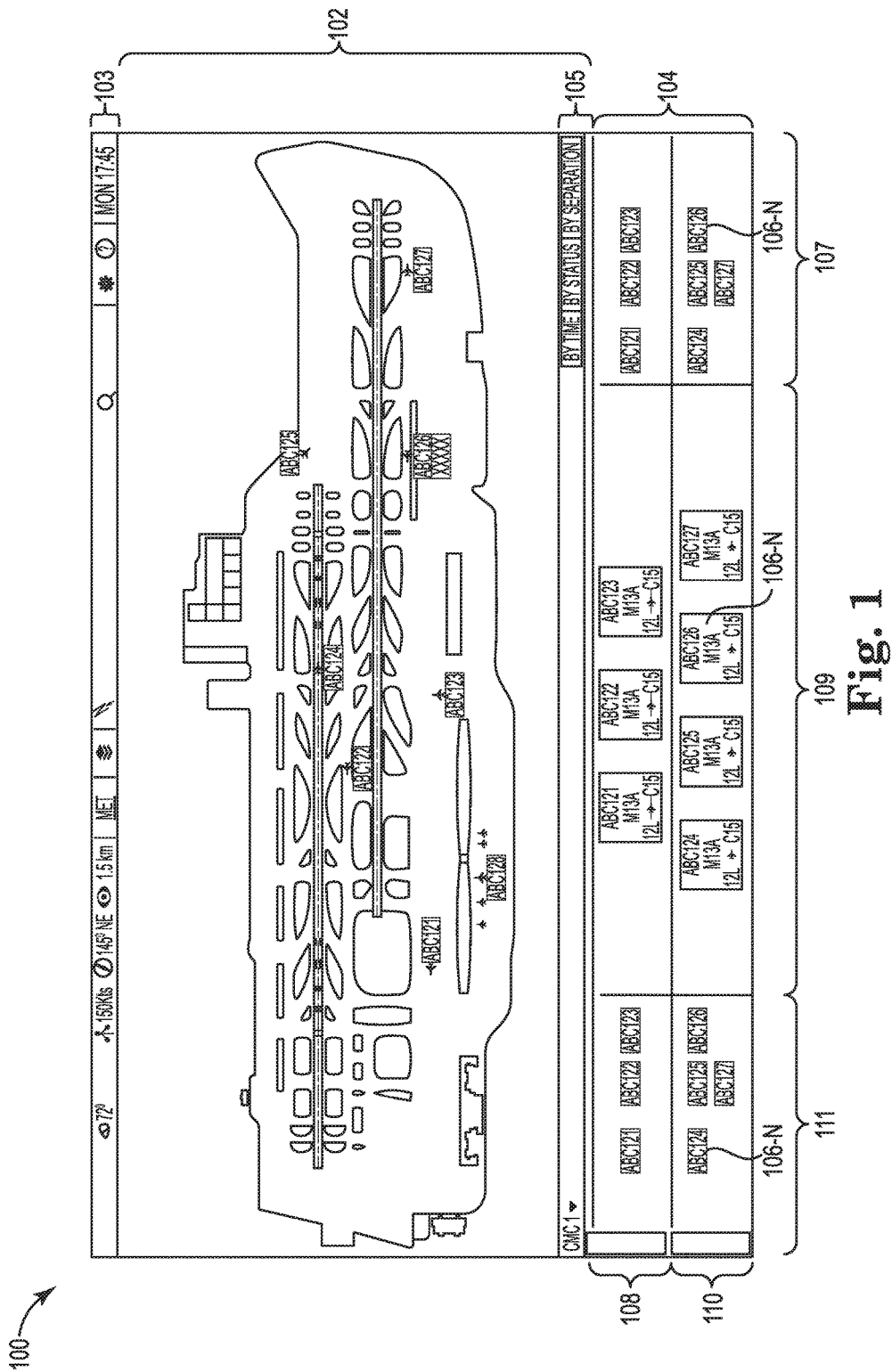
FIG. 1 is an illustration of a display provided on a user interface showing an air traffic control flight management analysis with a timeline view, generated in accordance with one or more embodiments of the present disclosure.

Methods, devices, and systems for air traffic control (ATC) flight management are described herein. In some examples, one or more embodiments include a memory, and a processor to execute executable instructions stored in the memory to receive airport information associated with an airport, generate, using the airport information, a card panel including a number of flight cards, wherein each respective one of the number of flight cards corresponds to a different respective aircraft at the airport, and a user interface configured to display the card panel in a timeline view in a single integrated display.

Air traffic control flight management, in accordance with the present disclosure, can allow an ATC controller to quickly gain situational awareness of airport operations in and around an airport. For example, using an ATC flight management analysis, an ATC controller can quickly determine the status of various aircraft in and/or around the airport and make decisions to safely and efficiently direct those aircraft. Determining the status of aircraft and directing those aircraft can allow for safe and efficient management of air traffic in and around the airport, providing a safe and efficient flow of air traffic and reducing delays for passengers and/or airlines.

An ATC flight management analysis can be displayed on a single integrated display. Presenting the ATC flight management analysis in a single integrated display can allow an ATC controller or other users to quickly determine awareness regarding airport operations. The ATC controller can then utilize the displayed analysis to quickly decide aircraft position, direction, and/or movement type in and around the airport.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3.

As used herein, "a" or "a number of" something can refer to one or more such things. For example, "a number of aircraft" can refer to one or more aircraft.

FIG. 1 is an illustration of a display provided on a user interface (e.g., user interface 976, as described in connection with FIG. 9) showing an ATC flight management analysis 100 with a card panel view, generated in accordance with one or more embodiments of the present disclosure. As illustrated in FIG. 1, the ATC flight management analysis 100 can include an airport map 102, an airport information header 103, card panel 104, view toggle 105, and flight cards 106-N.

The ATC flight management analysis 100 can be generated by a computing device (e.g., computing device 970, as described in connection with FIG. 9) based on airport information associated with an airport received by the computing device. Airport information associated with an airport can be received by the computing device from flight information systems associated with the airport and/or other airports, a flight data processing system, an airport operations database associated with the airport and/or other airports, and/or another third party system. The ATC flight management analysis 100 can be generated in response to an input from an ATC controller (e.g., a user).

As used herein, an ATC controller can be a user (e.g., a person) associated with the airport operator or air navigational service provider entrusted with the responsibility of providing air traffic services to aircraft and/or other vehicles. An airport can include multiple ATC controllers, who can use ATC flight management analysis 100 independent of each other.

The ATC flight management analysis 100 can include an airport information header 103. The airport information header 103 can include meteorological information for the airport. For example, the meteorological information can include wind speeds, wind directions, visibility (e.g., meteorological visibility) around the airport, and/or other weather related information. Meteorological related information can help an ATC controller change airport operating modes. The change of operating modes can include landing direction changes, change of operating category (e.g., CAT1, CAT2, or CAT3), change of ambient light conditions (e.g., day, twilight, night) based on visibility conditions or other parameters.

The airport information header 103 can include other controls such as a search (e.g., to search for a particular aircraft), settings (e.g., airport operational modes such as daytime, nighttime, and/or twilight operation), date and time information, etc.

The ATC flight management analysis 100 can include an airport map 102 showing locations of aircraft at the airport. As used herein, an aircraft refers to a machine that is able to fly by gaining support from the air. The airport map 102 can show the locations of various aircraft in and/or around the airport, as well as other vehicles such as "follow-me" vehicles, maintenance vehicles, etc.

In some examples, aircraft that may be taxiing to or from different locations, such as to or from a parking stand to another parking stand, a parking stand to or from a hangar, a parking stand to or from a runway, a route from a holding position for an aircraft waiting for a parking stand, or any other taxiing route including but not limited to the above listed taxiing locations. Aircraft taxiing may be shown along taxiways on airport map 102. As used herein, taxiing may refer to the movement of an aircraft on the ground.

In some examples, aircraft that are parked at a parking stand or a gate may be shown at the corresponding parking stand or gate on airport map 102. In some examples, aircraft that are taking off or landing may be shown on or near a runway of the airport on airport map 102.

Although not shown for clarity and so as not to obscure embodiments of the present disclosure, aircraft shown on airport map 102 may be color coded. For example, an aircraft that is arriving (e.g., landing) at the airport may be color coded differently than an aircraft that is departing (e.g., taking off). For instance, an aircraft that is arriving at the airport may be color coded yellow, whereas an aircraft that is departing the airport may be color coded blue, although embodiments of the present disclosure are not limited to a yellow and blue color coding scheme. However, embodiments of the present disclosure are not limited to color coding aircraft that are arriving or departing. For instance, aircraft that may have broken down, are delayed, aircraft experiencing an emergency situation, aircraft that are parked, and/or aircraft being towed may be color coded, among other examples of color coded aircraft shown on airport map 102.

In some examples, color coding can indicate which aircraft shown on airport map 102 an ATC controller has control over. In some airports, multiple ATC controllers, with each having jurisdiction over a defined area, can control aircraft within their jurisdiction or area of responsibility in and/or around the airport. For instance, one or more ATC controllers may be ground movement controllers directing aircraft on the ground at the airport. One or more ATC controllers may be runway controllers directing aircraft arriving at or departing from the airport.

Aircraft under control of the ground controllers can be color coded as white on airport map 102, where aircraft not under control of the ground controllers can be color coded as grey. For example, a ground controller can direct an aircraft that is moving from a gate at a terminal of the airport to a runway, where that aircraft is color coded white. As the aircraft reaches the runway, the aircraft can be transferred to a runway ATC controller, where the color coding of the aircraft for the ground controller may be revised to be color coded as grey. Continuing with this example, the aircraft may be color coded as grey for the runway ATC controller until control of the aircraft is transferred to the runway ATC controller, at which point the color coding of the aircraft may be revised to be color coded as white for the runway ATC controller.

Although not shown for clarity and so as not to obscure embodiments of the present disclosure, airport map 102 can show a status of airfield navigational aids located at the airport. As used herein, an airfield navigational aid refers to an aid to guide an aircraft around airport taxiways and runways, including surface markings, signs, lights, etc. For example, airport map 102 can show the status of taxiway edge/centerline lights, clearance bar lights, runway guard lights, stop bar lights, etc., including whether the lights are on or off, functioning properly, whether there is a malfunction, etc.

The ATC flight management analysis 100 can include a card panel 104. As used herein, a card panel refers to a method of organizing and/or annotating flights of aircraft. Card panel 104 can include flight cards 106-N, as will be further described herein with respect to FIG. 2A. Each of the flight cards 106-N can correspond to a different respective one of the aircraft at the airport. For example, a flight card 106-N can correspond to an aircraft shown on airport map 102. Card panel 104 can be shown in a timeline view, a clearance status view, and/or a separation view, as will be further described herein.

As illustrated in FIG. 1, card panel 104 is shown in a timeline view. The timeline view of card panel 104 shows the flight cards 106-N organized in chronological order. For instance, the flight cards 106-N can be organized and arranged based on estimated times of arrival for arriving aircraft, and estimated times of departure for departing aircraft, as will be further described herein.

Card panel 104 can be organized by time interval. For example, card panel 104 can be organized into a past flight interval 107, a current flight interval 109, and a future flight interval 111. The past flight interval 107, current flight interval 109, and future flight interval 111 can be shown in different time intervals. In some examples, past flight interval 107 can show (e.g., via flight cards 106-N) aircraft that have arrived at or departed from the airport in a time interval (e.g., forty minutes). Future flight interval 111 can show aircraft that are arriving at or departing from the airport in a time interval (e.g., forty minutes). In some examples, current flight interval 109 can show aircraft that are arriving at or departing from the airport in a time interval (e.g., twenty minutes).

In some examples, an ATC controller may be interested in seeing more or less flight cards 106-N in current flight interval 109 and can increase or decrease the time interval from twenty minutes as necessary (e.g., from twenty minutes to more or less than twenty minutes). In some examples, an ATC controller may be interested in seeing more or less flight cards 106-N in past flight interval 107 and/or future flight interval 111 and can increase or decrease the time intervals from forty minutes as necessary (e.g., from forty minutes to more or less than forty minutes). That is, the time intervals of past flight interval 107, current flight interval 109, and/or future flight interval 111 are configurable.

As illustrated in FIG. 1, past flight interval 107 and future flight interval 111 can show more flight cards 106-N in a collapsed view relative to the flight cards 106-N shown in an expanded view in current flight interval 109. For example, flight cards 106-N that are in current flight interval 109 can show more information than flight cards 106-N that are in past flight interval 107 and/or future flight interval 111. An ATC controller may want to see more information regarding flight cards 106-N that are in the current flight interval 109, as those aircraft may require more immediate attention and/or direction than those aircraft corresponding to flight cards 106-N in past flight interval 107 and/or future flight interval 111.

Card panel 104 can include an arrival card panel 108. Arrival card panel 108 can include flight cards 106-N corresponding to aircraft arriving at the airport. For instance, aircraft that have arrived at the airport can be shown in arrival card panel 108 in past flight interval 107, and aircraft that are arriving at the airport in future time intervals can be shown in arrival card panel 108 in current flight interval 109 or future flight interval 111. That is, arrival aircraft at the airport can be shown in arrival card panel 108 in chronological order.

Card panel 104 can include a departure card panel 110. Departure card panel 110 can include flight cards 106-N corresponding to aircraft departing the airport. For instance, aircraft that have departed the airport can be shown in departure card panel 110 in past flight interval 107, and aircraft that are departing from the airport in future time intervals can be shown in departure card panel 110 in current flight interval 109 or future flight interval 111. That is, departure aircraft at the airport can be shown in departure card panel 110 in chronological order.

Card panel 104 can be scrollable (e.g., by touch gestures and/or a user input interaction from a mouse). In some examples, an ATC controller can scroll card panel 104 forwards in time and/or backwards in time to see future arrival/departure flights and/or past arrival/departure flights, respectively. Scrolling of card panel 104 can occur in response to an input from the ATC controller. In some examples, card panel 104 can scroll and/or update the flight cards 106-N located in past flight interval 107, current flight interval 109, and future flight interval 111, as aircraft arrive and/or depart from the airport. For example, as an aircraft departs the airport, a flight card corresponding to that aircraft can be re-organized from current flight interval 109 to past flight interval 107. A flight card corresponding to an arriving aircraft or a departing aircraft can be re-organized from future flight interval 111 to current flight interval 109 as that aircraft becomes within twenty minutes of arriving at or departing from the airport, respectively.

ATC flight management analysis 100 can include a view toggle 105. The view toggle 105 can toggle the view of card panel 104. For example, in response to a user input, card panel 104 can be shown in a timeline view (e.g., as described herein with respect to FIG. 1), a clearance status view (e.g., as described with respect to FIG. 3), or a separation view (e.g., as will be described with respect to FIGS. 4-5).

An ATC flight management analysis, such as ATC flight management analysis 100 illustrated in FIG. 1, can provide users, such as an ATC controllers, with up to date information regarding the status of various aircraft in and/or around the airport and allow ATC controllers to quickly make decisions to safely and efficiently direct those aircraft. A single integrated display can present the ATC flight management analysis to the ATC controller in a compact and efficient way, allowing an ATC controller to track arrival and/or departure sequences of many aircraft, allowing for planning and preparation to efficiently and safely direct aircraft in and/or around the airport.

FIG. 2A is an illustration of a display provided on a user interface (e.g., user interface 976, as described in connection with FIG. 9) showing a flight card 212, generated in accordance with one or more embodiments of the present disclosure. Flight card 212 can be, for example, flight card 106-N, previously described in connection with FIG. 1.

Flight card 212 can include flight information corresponding to an aircraft at the airport. Flight information can include a flight call sign 214, an aircraft type 216, ground routing information of the aircraft 218, a departure and/or destination airport 220, color coding information, and/or an action indicator 221, although embodiments of the present disclosure are not limited to the above listed flight information. Flight information shown on flight card 212 can be modifiable. That is, more or less flight information may be shown on flight card 212.

Flight information can include a flight call sign 214. As used herein, a flight call sign identifies a particular aircraft. For example, as illustrated in FIG. 2A, the flight call sign 214 is indicated or identified as ABC235, indicating the aircraft is operating as flight 235, operated by ABC Airline.

Flight information can include an aircraft type 216. Aircraft type 216 can include a model of the aircraft and/or the type of aircraft. For example, the aircraft type 216 is indicated as an A388 J, indicating the aircraft model corresponding to flight call sign 214 ABC123 is an Airbus A380-800 (e.g., ICAO 3 digit code A388), where the letter following the aircraft type 216 indicates the aircraft type. Aircraft models are not limited to Airbus A380. For example, a Boeing 747-400 may be indicated as "744" and an Airbus A330-300 may be indicated as "A333", although embodiments of the present disclosure are not limited to the above listed aircraft models.

Aircraft type 216 can include labels indicating the size of the aircraft. Aircraft type 216 can include super heavy aircraft, heavy aircraft, medium aircraft, and/or small aircraft, although embodiments of the present disclosure are not limited to the above listed labels for an aircraft type.

Although aircraft type 216 is indicated by text describing the aircraft model and type, embodiments of the present disclosure are not so limited. For example, aircraft type 216 may be indicated by different symbols indicating the type of aircraft (e.g., "Super Heavy", "Heavy", "Medium", and/or "Small").

Flight information can include ground routing information of the aircraft 218. As used herein, ground routing information of the aircraft 218 refers to a starting point of the aircraft while at the airport and an ending point of the aircraft while at the airport. For example, as illustrated in FIG. 2A, ground routing information of the aircraft 218 indicates the aircraft corresponding to flight call sign 214 ABC123 is taxiing from runway 12L to parking stand or hangar C15, and is currently at holding point M13A.

Flight information can include a departure airport and/or a destination airport 220. As used herein, a departure airport indicates an airport at which an aircraft originates, and a destination airport indicates an airport at which an aircraft is to arrive. The departure airport and/or the destination airport 220 can be designated by airport codes. As used herein, an airport code is a code designating a specific airport. For example, as illustrated in FIG. 2A, the departure airport code indicates the aircraft departed from LHR (e.g., Heathrow Airport, London, United Kingdom) and the destination airport code indicates the aircraft is destined for DXB (e.g., Dubai International Airport, Dubai, United Arab Emirates).

Flight information can include an action indicator 221. Action indicator 221 can indicate to an ATC controller whether action needs to be taken for that aircraft. For example, action indicator 221 can indicate to an ATC controller the aircraft is taxiing, and that an action needs to be taken for that aircraft (e.g., give clearance to take off and/or land, taxi along a predetermined or modified route, to stop, etc.) The icon included in action indicator 221 can correspond to a given action. For example, as shown in FIG. 2A, action indicator 221 can display to the ATC controller that the aircraft is taxiing.

In some examples, a filled circle can indicate that an action needs to be taken for that aircraft, whereas an empty circle can indicate that no action needs to be taken for that aircraft. In some embodiments, the circle can be color coded white to indicate that an action needs to be taken for that aircraft and color coded grey to indicate that no action needs to be taken for that aircraft. In some examples, the action indicator 221 can include a border/filled circle that can be color coded white to indicate that an action needs to be taken for that aircraft and color coded grey to indicate that no action needs to be taken for that aircraft. In some examples, the filled circle can be color coded red/amber when a conflict occurs to notify an ATC controller of the conflict. That is, the action indicator 221 can be color coded in response to a sub-group of the aircraft at the airport that includes the aircraft corresponding to flight card 212 reaching a common point of convergence in a separation view, as will be further described herein with respect to FIG. 4. In some examples, the filled circle can be color coded green in response to an aircraft getting a runway clearance. In some examples, any combination of the above indication methods may be utilized to indicate to the ATC controller the status of the aircraft.

Action indicator 221 can change based on a status of an aircraft at the airport. For example, as shown in FIG. 2A, action indicator 221 can display an icon indicating the aircraft corresponding to flight card 212 is taxiing. Action indicator 221 can change to a different icon in response to a change in the status of an aircraft at the airport, for example a change in the status from taxiing to parked at a parking stand. That is, icon displayed in action indicator 221 can change such that the icon can correspond to a status of an aircraft at the airport. The icon displayed in action indicator 221 can allow an ATC controller to quickly determine the status of an aircraft at the airport by simply looking at action indicator 221.

Although flight card 212 is described as including a flight call sign 214, an aircraft type 216, ground routing information of the aircraft 218, a departure and/or a destination airport 220, an action indicator 221, and/or color coding information, embodiments of the present disclosure are not so limited. For example, any combination of the above listed flight information, including the current time, next aircraft hold position, and/or any other flight information may be included on flight card 212.

A user may modify the flight information as shown in flight card 212. For example, a user may modify via a settings menu whether flight call sign 214, aircraft type 216, ground routing information of the aircraft 218, a departure and/or destination airport 220, color coding information, and/or an action indicator 221 are shown in flight card 212. That is, less than all of the above listed flight information or any combination of the above listed flight information may be selected to be shown in flight card 212.

FIG. 2B is an illustration of a display provided on a user interface (e.g., user interface 976, as described in connection with FIG. 9) showing a pushback menu 213, generated in accordance with one or more embodiments of the present disclosure. Pushback menu 213 can include pushback direction 215 and pushback clearance 217-1, 217-2.

Similar to the flight card described in connection with FIG. 2A, pushback menu 213 can include flight information corresponding to an aircraft at the airport. Flight information can include a flight call sign (e.g., ABC123), an aircraft type (e.g., A388 J), a current location (e.g., parking stand B12), ground taxi destination (e.g., runway 12L), although embodiments of the present disclosure are not limited to the above listed flight information. Flight information shown on pushback menu 213 can be modifiable. That is, more or less flight information may be shown on pushback menu 213.

Pushback menu 213 can include pushback direction 215. For example, an aircraft (e.g., call sign ABC123) may request clearance to push back from stand B12, and an ATC controller may select a directional pushback in response to the clearance request for a pushback. An ATC controller can select the directional pushback clearance to the aircraft via a user input to pushback direction 215 by selecting "E" to give the direction to the aircraft for a pushback. In some examples, an ATC controller may give clearance for the aircraft to proceed with an east pushback by selecting pushback clearance 217-1. For example, by selecting pushback clearance 217-1, an ATC controller can give the aircraft clearance for an "East Short Push", indicating clearance for an east short push pushback.

In some examples, an ATC controller may modify the type of pushback by selecting pushback clearance 217-2. For example, after determining the aircraft should receive clearance for an east pushback, the ATC controller may determine the east pushback should be a short push, a long push, or for the aircraft to pull forward. The ATC controller can make this determination using pushback clearance 217-2.

Although described as an ATC controller giving clearance to an aircraft for an east short push pushback, embodiments of the present disclosure are not so limited. For example, an ATC controller may give a west, east, north, or south directional clearance for a pushback or pull forward, or any combination thereof.

Using pushback menu 213, an ATC controller can give pushback clearance to an aircraft. Once an aircraft receives pushback clearance, a change in the clearance status of the aircraft occurs. For example, the clearance status of the aircraft can be changed from pushback to departure taxi, and can result in the aircraft being grouped into a different clearance status in a clearance status view of a card panel, as will be further described in connection with FIG. 3.

Figure 3:
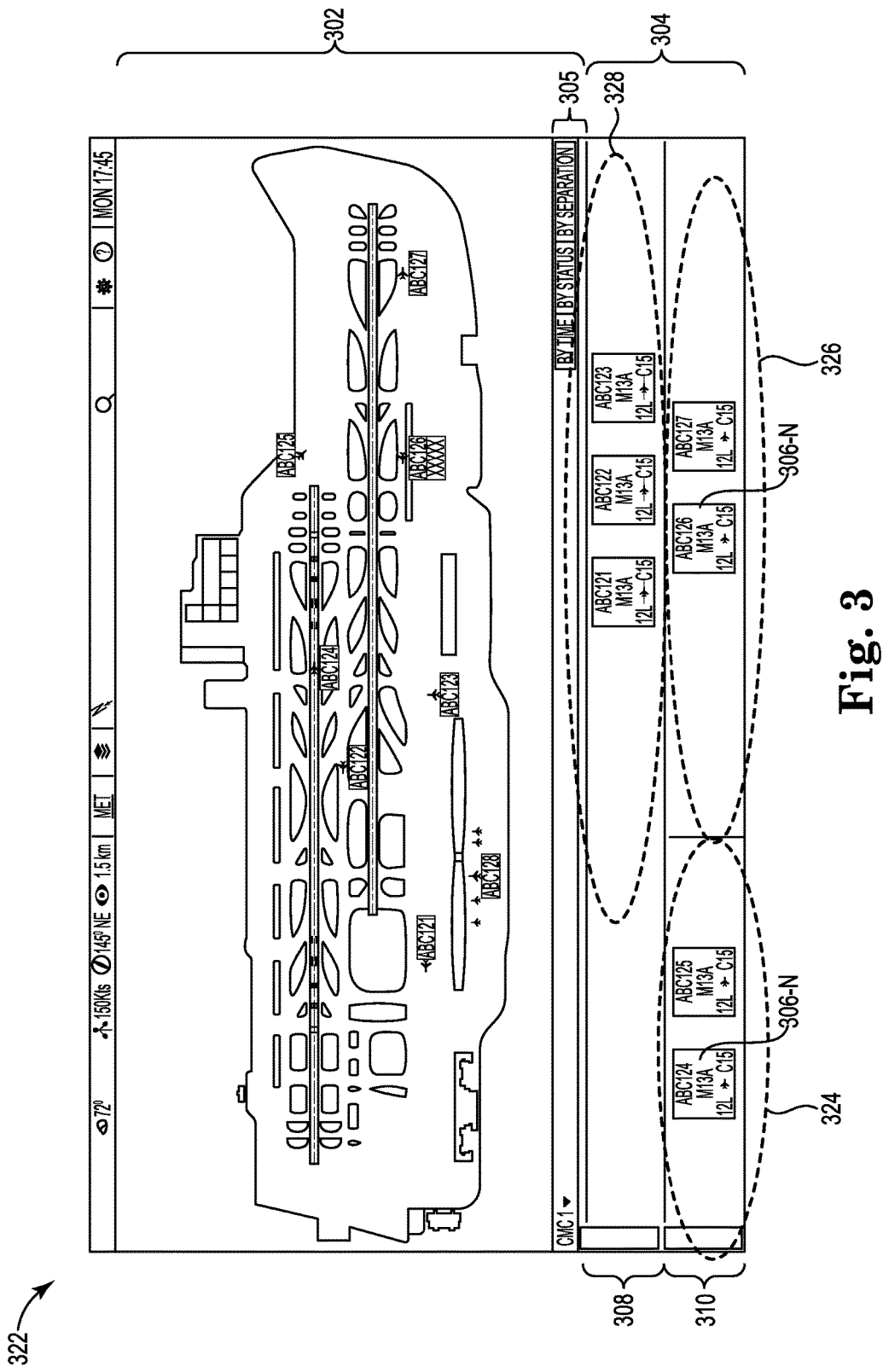
FIG. 3 is an illustration of a display provided on a user interface showing an air traffic control flight management analysis with a clearance status view, generated in accordance with one or more embodiments of the present disclosure.

FIG. 3 is an illustration of a display provided on a user interface (e.g., user interface 976, as described in connection with FIG. 9) showing an ATC flight management analysis 322 with a clearance status view, generated in accordance with one or more embodiments of the present disclosure. The ATC flight management analysis 322 with a clearance status view can include airport map 302 (e.g., airport map 102, previously described in connection with FIG. 1), card panel 304 (e.g., card panel 104, previously described in connection with FIG. 1), and view toggle 305 (e.g., view toggle 105, previously described in connection with FIG. 1). Card panel 304 can include flight cards 306-N (e.g., flight cards 106-N, previously described in connection with FIG. 1), arrival card panel 308 (e.g., arrival card panel 108, previously described in connection with FIG. 1) and departure card panel 310 (e.g., departure card panel 110, previously described in connection with FIG. 1).

The ATC flight management analysis 322 can be generated by a computing device based on airport information associated with an airport received by the computing device. The ATC flight management analysis 322 can be generated in response to an input from an ATC controller (e.g., a user).

The ATC flight management analysis 322 can include an airport map 302 showing locations of aircraft at the airport. The airport map 302 can show the locations of various aircraft in and/or around the airport.

The ATC flight management analysis 322 can include a card panel 304, where card panel 304 can include flight cards 306-N. Each of the flight cards 306-N can correspond to a respective one of the aircraft at the airport. For example, a flight card 306-N can correspond to an aircraft shown on airport map 302.

As illustrated in FIG. 3, card panel 304 is shown in a clearance status view. The clearance status view of card panel 304 shows the flight cards 306-N grouped by clearance status. As used herein, clearance status refers to permissions for an aircraft to take an action. For instance, the flight cards 306-N can be grouped based on clearance status of each of the aircraft corresponding to their respective flight cards 306-N.

In some examples, aircraft departing the airport can be associated with clearance statuses including pushback clearance, ground taxi clearance, handover, crossing clearance, line up clearance, and/or takeoff clearance, although embodiments of the present disclosure are not limited to the above listed clearance statuses. For example, as illustrated in FIG. 3, flight cards 306-N included in pushback clearance 324 have been grouped based on those aircraft having received clearance to push back from their parking stand/gates. Flight cards 306-N included in taxi clearance 326 have been grouped based on those aircraft having received clearance to taxi towards a runway for departure.

In some examples, aircraft arriving at the airport can be associated with clearance statuses including awaiting landing clearance, landing clearance, handover, crossing clearance, and/or ground taxi clearance, although embodiments of the present disclosure are not limited to the above listed clearance statuses. For example, as illustrated in FIG. 3, flight cards 306-N included in taxi clearance 328 have been grouped based on those aircraft having landed, and are taxiing towards a parking stand or gate.

Similar to FIG. 1, card panel 304 can include an arrival card panel 308 and a departure card panel 310. Arrival card panel 308 can include flight cards 306-N corresponding to aircraft arriving at the airport. Departure card panel 310 can include flight cards 306-N corresponding to aircraft departing from the airport. Arriving and departing aircraft can be organized and arranged based on clearance status in the clearance status view of ATC flight management analysis 322.

Flight cards 306-N and/or the aircraft corresponding to flight cards 306-N shown on airport map 302 can be color coded to indicate which aircraft an ATC controller has control over. For instance, one or more ATC controllers may be ground movement controllers directing aircraft on the ground at the airport. One or more ATC controllers may be runway controllers directing aircraft arriving at or departing from the airport.

Aircraft under control of the ground controllers can be color coded as white on airport map 302, where aircraft not under control of the ground controllers can be color coded as grey.

Once a departing aircraft is ready for pushback from a gate, an ATC controller that has control of the aircraft can give pushback clearance to that aircraft via a user input to the computing device. In some examples, the ATC controller can "drag and drop" the flight card corresponding to the departing aircraft from pushback clearance status to departure taxi clearance status.

If an arriving aircraft is ready to land, an ATC controller that has control of the aircraft can give arrival taxi clearance to that aircraft via a user input to the computing device. In some examples, the ATC controller can "drag and drop" the flight card corresponding to the arriving aircraft from landing clearance status to arrival taxi status.

The computing device can cause a flight card among the number of flight cards to be re-grouped based on a change in the clearance status of the aircraft at the airport corresponding to the flight card. For example, an aircraft with call sign "ABC124" may be departing the airport and have been given ground taxi clearance. In response to the change in clearance, flight card 306-N corresponding to the aircraft with call sign "ABC124" may be re-grouped from pushback clearance 324 to taxi clearance 326.

ATC flight management analysis 322 can include a view toggle 305. The view toggle 305 can toggle the view of card panel 304. For example, in response to a user input, card panel 304 can be shown in a timeline view, a clearance status view, or a separation view.

ATC flight management analysis 322 can provide ATC controllers with up to date information regarding clearance status of aircraft in and around the airport. Since ATC controllers may deal with many different aircraft at once, color coding information can easily inform an ATC controller about the clearance status of aircraft they are controlling, as well as aircraft they may need to control in the future and/or aircraft they have controlled in the past.

Figure 4:
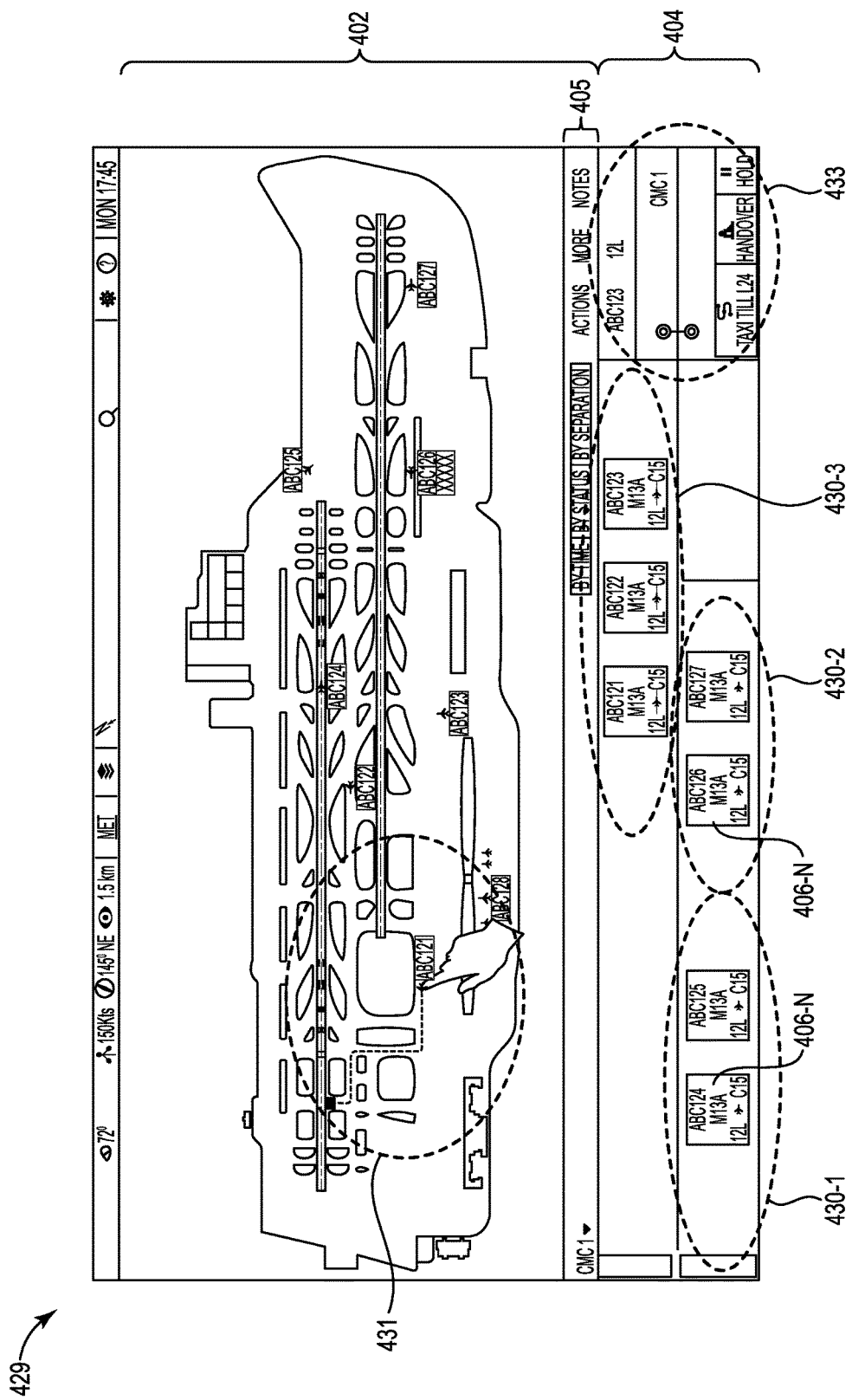
FIG. 4 is an illustration of a display provided on a user interface showing an air traffic control flight management analysis with a separation view, in accordance with one or more embodiments of the present disclosure.

FIG. 4 is an illustration of a display provided on a user interface (e.g., user interface 976, as described in connection with FIG. 9) showing an ATC flight management analysis 429 with a separation view, in accordance with one or more embodiments of the present disclosure.

The ATC flight management analysis 429 with a separation view can include airport map 402 (e.g., airport map 102, 302, previously described in connection with FIGS. 1 and 3, respectively), card panel 404 (e.g., card panel 104, 304, previously described in connection with FIGS. 1 and 3, respectively), and view toggle 405 (e.g., view toggle 105, 305, previously described in connection with FIGS. 1 and 3, respectively). Card panel 404 can include flight cards 406-N (e.g., flight cards 106-N, 306-N, previously described in connection with FIGS. 1 and 3, respectively) (referred to collectively as flight cards 406).

The ATC flight management analysis 429 can be generated by a computing device based on airport information associated with an airport received by the computing device. The ATC flight management analysis 429 can be generated in response to an input from an ATC controller (e.g., a user).

The ATC flight management analysis 429 can include an airport map 402 showing locations of aircraft at the airport. The airport map 402 can show the locations of various aircraft in and/or around the airport.

The ATC flight management analysis 429 can include a card panel 404, where card panel 404 can include flight cards 406-N. Each of the flight cards 406-N can correspond to a respective one of the aircraft at the airport. For example, a flight card 406-N can correspond to an aircraft shown on airport map 402.

As illustrated in FIG. 4, card panel 404 is shown in a separation view. The separation view of card panel 404 shows the flight cards 406-N grouped into sub-groups by aircraft corresponding to the flight cards 406-N reaching a common point of convergence. For instance, three aircraft at the airport may have ground routing information that can result in the three aircraft taxiing towards a common point of convergence, such as a taxiway intersection, at the airport. The separation view of card panel 404 can show a grouping of the flight cards corresponding to those three aircraft, in addition to other groups of flight cards corresponding to other aircraft that may be reaching a common point of convergence.

In some examples, group of flight cards 430-1 includes four flight cards 406-N corresponding to four aircraft that may be reaching a common point of convergence. Group of flight cards 430-2 includes three flight cards 406-N corresponding to three aircraft that may be reaching a common point of convergence. Group of flight cards 430-3 includes five flight cards 406-N corresponding to five aircraft that may be reaching a common point of convergence.

The computing device can prioritize a sub-group of the aircraft at the airport based on an aircraft of the sub-group of the aircraft exceeding a threshold distance between other aircraft of the sub-group of the aircraft at the airport. For example, the computing device can prioritize group of flight cards 430-1 based on aircraft with call sign "ABC124" exceeding a threshold distance between aircraft with call sign "ABC125". For instance, aircraft "ABC124" may have moved within 100 feet of aircraft "ABC125", resulting in group of flight cards 430-1 being prioritized for an ATC controller. The threshold distance can be configurable.

Group of flight cards 430-1 may be prioritized in various ways, including highlighting group of flight cards 430-1, color coordinating group of flight cards 430-1, generating noise alerts, among other audible or visual notification methods.

Figure 2:
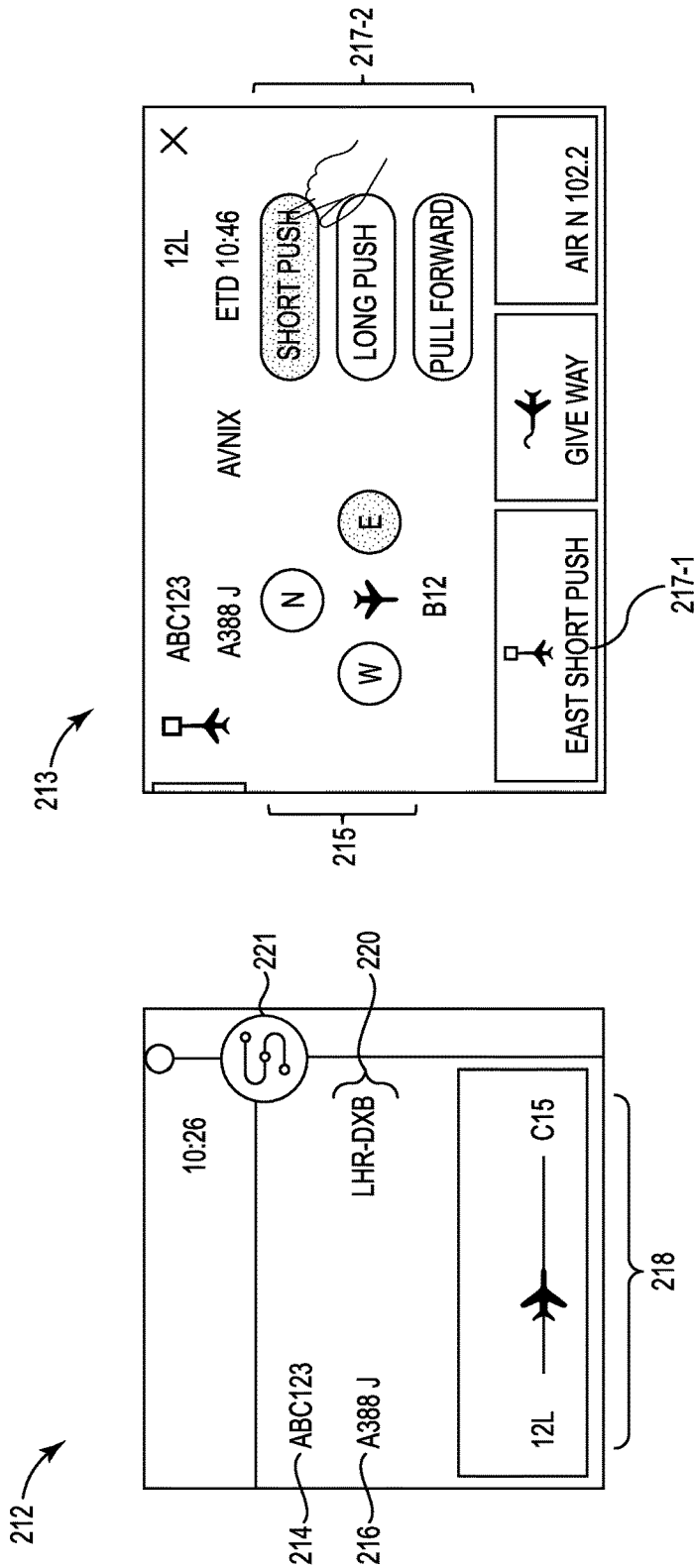
FIG. 2A is an illustration of a display provided on a user interface showing a flight card, generated in accordance with one or more embodiments of the present disclosure.
FIG. 2B is an illustration of a display provided on a user interface showing a pushback menu, generated in accordance with one or more embodiments of the present disclosure.

As previously described in connection with FIG. 2, flight cards 406 can include an action indicator. The action indicator can include a filled circle which may be color coded when a conflict occurs. The color coding can notify an ATC controller of the conflict. For example, based on aircraft with flight call sign "ABC124" exceeding a threshold distance between aircraft with call sign "ABC125", the action indicator can be color coded red to notify the ATC controller of the conflict between the two aircraft.

Although not shown in FIG. 4 for clarity and so as not to obscure embodiments of the present disclosure, ground routing information may be color coded in response to a conflict. For example, the ground taxi route of aircraft with flight call sign "ABC124" and the ground taxi route of aircraft with flight call sign "ABC125" may be color coded red to notify the ATC controller of the conflict between the two aircraft.

As illustrated in FIG. 4, card panel 404 does not include an arrival card panel and a departure card panel. The separation view of ATC flight management analysis 429 can allow an ATC controller to view departing aircraft and arriving aircraft that may be reaching a common point of convergence, resulting in a conflict. The ATC controller can direct those aircraft under their control by, for example, assigning a hold point to those aircraft, changing ground routing priority of those aircraft, and/or modifying ground routing information of those aircraft in order to resolve a conflict, as will be further described herein with respect to FIGS. 5 and 6.

In some examples, airport map 402 can display aircraft information 431 in response to a user input. For example, an ATC controller may click on one of the flight cards 406-N, and/or an aircraft displayed on airport map 402 and airport map 402 can, in response to the selection, display aircraft information 431.

Aircraft information 431 can include aircraft flight information, including the aircraft's flight call sign, aircraft type, ground routing information of the aircraft, a departure and/or destination airport, an action indicator, and/or color coding information, although aircraft information 431 is not limited to the above listed information.

In some examples, airport map 402 can display menu 433 for flight card 406-N in response to a selection of a flight card 406-N via a user input. Menu 433 can include the same and/or different information as aircraft information 431.

In some examples, menu 433 can include action information, including current contextual actions available for an ATC controller. For example, menu 433 can display contextual actions for the ATC controller including "HANDOVER" the selected aircraft, cause the aircraft to "HOLD" position, etc. Overall area of responsibility may be divided among a number of ATC controllers. Each ATC controller can manage the aircraft traffic under their respective area of responsibility. That is, different ATC controllers may control different groups (e.g., sub-groups) of the total number of aircraft at the airport. Control may be transferred by selecting "HANDOVER", as shown as part of menu 433 in FIG. 4. Action information can include a history of previous actions taken by the ATC controller and/or other ATC controllers for the aircraft. Action information can include secondary actions, such as adding a "follow-me" vehicle.

In some examples, menu 433 can include flight information, including a flight call sign, an aircraft type, ground routing information of the aircraft, a departure and/or destination airport, color coding information, stand details, speed, sequence number, etc.

In some examples, menu 433 can include notes. For example, an ATC controller can add notes to flight card 406-N and/or view notes regarding the aircraft corresponding to flight card 406-N left by other ATC controllers. Notes can be visible by all ATC controllers and/or can be visible by a portion of ATC controllers (e.g., viewable only by ATC controller jurisdiction, as previously described in connection with FIG. 1). Notes can include a priority rating (e.g., emergency notes for medical, fire, intrusion, etc. can be given a higher priority than other notes).

The computing device can send an instruction to an aircraft at the airport to change a ground taxi route of the aircraft in response to a user input via menu 433. For example, an ATC controller can change a ground taxi route of an aircraft at the airport, and send the revised ground taxi route to the aircraft via menu 433.

ATC flight management analysis 429 can provide ATC controllers with up to date information regarding separation of aircraft in and around the airport. The separation view of ATC flight management analysis 429 can allow ATC controllers to safely direct aircraft in and around the airport to avoid collisions between aircraft.

Figure 5:
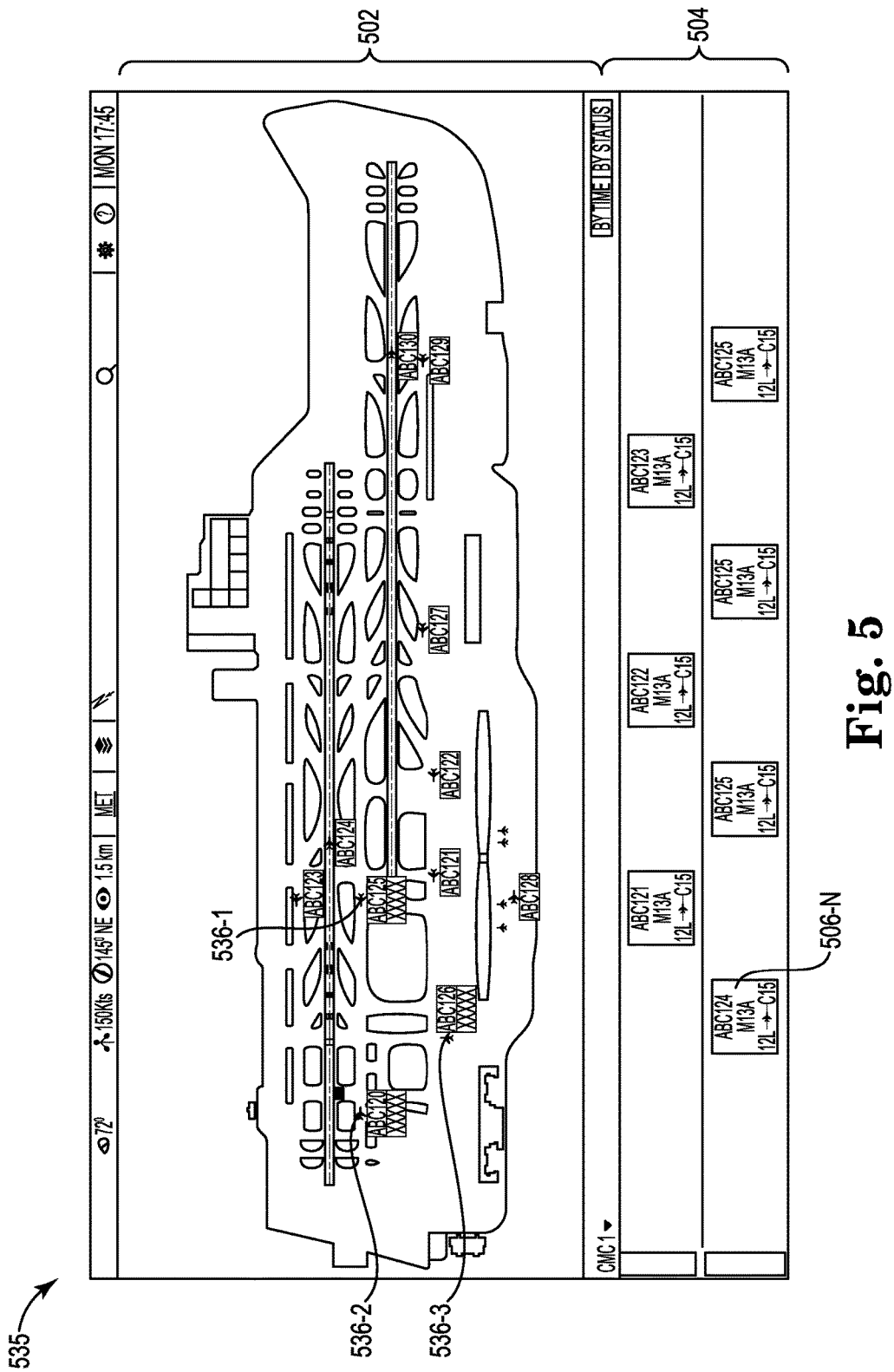
FIG. 5 is an illustration of a display provided on a user interface showing an air traffic control flight management analysis with a separation view, in accordance with one or more embodiments of the present disclosure.

FIG. 5 is an illustration of a display provided on a user interface (e.g., user interface 976, as described in connection with FIG. 9) showing an ATC flight management analysis 535 with a separation view, in accordance with one or more embodiments of the present disclosure. The ATC flight management analysis 535 with a separation view can include airport map 502 (e.g., airport map 102, 302, 402, previously described in connection with FIGS. 1, 3, and 4 respectively), and card panel 504 (e.g., card panel 104, 304, 404, previously described in connection with FIGS. 1, 3, and 4, respectively). Card panel 504 can include flight cards 506-N (e.g., flight cards 106-N, 306-N, 406-N previously described in connection with FIGS. 1, 3, and 4, respectively).

The ATC flight management analysis 535 can be generated by a computing device based on airport information associated with an airport received by the computing device. The ATC flight management analysis 535 can be generated in response to an input from an ATC controller (e.g., a user).

The computing device can determine, using the airport information received by the computing device, a conflict between a group of aircraft at the airport. A conflict can include a potential collision between aircraft, an aircraft that has overrun a stop bar, an aircraft that has deviated from an assigned ground taxi route, an emergency, and/or overlapping ground taxi routes of different aircraft, among other types of conflicts.

As illustrated in FIG. 5, the computing device can determine a conflict between aircraft 536-1, 536-2, and 536-3 (referred to collectively as aircraft 536) shown on airport map 502. For example, aircraft 536 may be in conflict as a result of each of aircraft 536 converging on a common point based on their assigned ground taxi routes, resulting in a potential collision at that common point.

The computing device can generate a notification in response to the conflict. For example, the computing device can notify an ATC controller regarding the conflict between aircraft 536.

In some examples, a notification can include color coded locations on airport map 502 of each of the aircraft 536-1, 536-2, and 536-3. Aircraft 536-1, 536-2, and 536-3 can each be color coded red based on a potential conflict. Ground taxi routes of aircraft 536-1, 536-2, and 536-3 may additionally or alternatively be color coded red to indicate a conflict for aircraft 536.

In some examples, a notification can include color coded flight cards 506-N on card panel 504 that correspond to the aircraft 536 that are in conflict. Flight cards 506-N corresponding to aircraft 536-1, 536-2, and 536-3 can each be color coded red based on the potential conflict.

In some examples, a notification can include highlighting and/or color coding the aircraft 536 that are in conflict on the airport map 502. The flight cards 506 which correspond to the aircraft 536 that are in conflict may correspondingly be highlighted and/or color coded in card panel 504. In response to a user input selecting a flight card 506, a route (e.g., the conflicted route) of the aircraft 536 corresponding to the flight card 506 may be shown on airport map 502 and/or a menu (e.g., menu 433, previously described in connection with FIG. 4) may be shown. The menu may allow an ATC controller to stop or hold the aircraft 536 that are in conflict, or activate a stop bar just before a location where a conflict may occur, among other actions to resolve the conflict.

In some examples, the computing device can resolve the conflict by assigning a hold point to one or more of aircraft 536-1, 536-2, and/or 536-3. For example, aircraft 536-2 and 536-3 can be assigned a hold point so that aircraft 536-1 may clear the common point of convergence, at which point aircraft 536-2 or aircraft 536-3 can have their hold point assignment lifted so that aircraft 536-2 or aircraft 536-3 may clear the common hold point. The hold point may be assigned to one or more of aircraft 536-1, 536-2, and/or 536-3 in response to a user input to the computing device or may be assigned automatically by the computing device.

In some examples, the computing device can resolve the conflict by changing ground routing priority of one or more of aircraft 536-1, 536-2, and/or 536-3. For example, aircraft 536-2 and 536-3 can be assigned a lower priority than aircraft 536-1 so that aircraft 536-1 may clear the common point of convergence. Aircraft 536-3 can be assigned a lower priority than aircraft 536-2 so that aircraft 536-3 may clear the common point of convergence, at which point aircraft 536-3 can clear the common hold point. The ground routing priority may be changed or assigned to one or more of aircraft 536-1, 536-2, and/or 536-3 in response to a user input to the computing device, or may be changed or assigned automatically by the computing device.

Although an ATC controller may change ground routing priority of one or more of aircraft 536-1, 536-2, and/or 536-3 on ATC flight management analysis 535, aircraft 536-1, 536-2, and/or 536-3 do not receive the change in ground routing priority. The change in ground routing priority may be transmitted from ATC to pilots of one or more of aircraft 536-1, 536-2, and/or 536-3.

In some examples, the computing device can resolve the conflict by modifying ground routing information of one or more of aircraft 536-1, 536-2, and/or 536-3. Modifying the ground route of aircraft 536 can include modifying a taxi route, as will be further described herein with respect to FIG. 6. For example, ground routing information of aircraft 536-1 and 536-2 may be modified such that aircraft 536-1 and aircraft 536-2 can taxi along different routes that avoid the common point of convergence. Aircraft 536-3 may not have its ground routing information modified. The ground routing information of aircraft 536-1, 536-2, and/or 536-3 may be modified in response to a user input to the computing device or may be modified automatically by the computing device.

Although an ATC controller may change ground routing information of one or more of aircraft 536-1, 536-2 on ATC flight management analysis 535, and/or 536-3, aircraft 536-1, 536-2, and/or 536-3 do not receive the change in ground routing information. The change in ground routing information may be transmitted from ATC to pilots of one or more of aircraft 536-1, 536-2, and/or 536-3.

Figure 6:
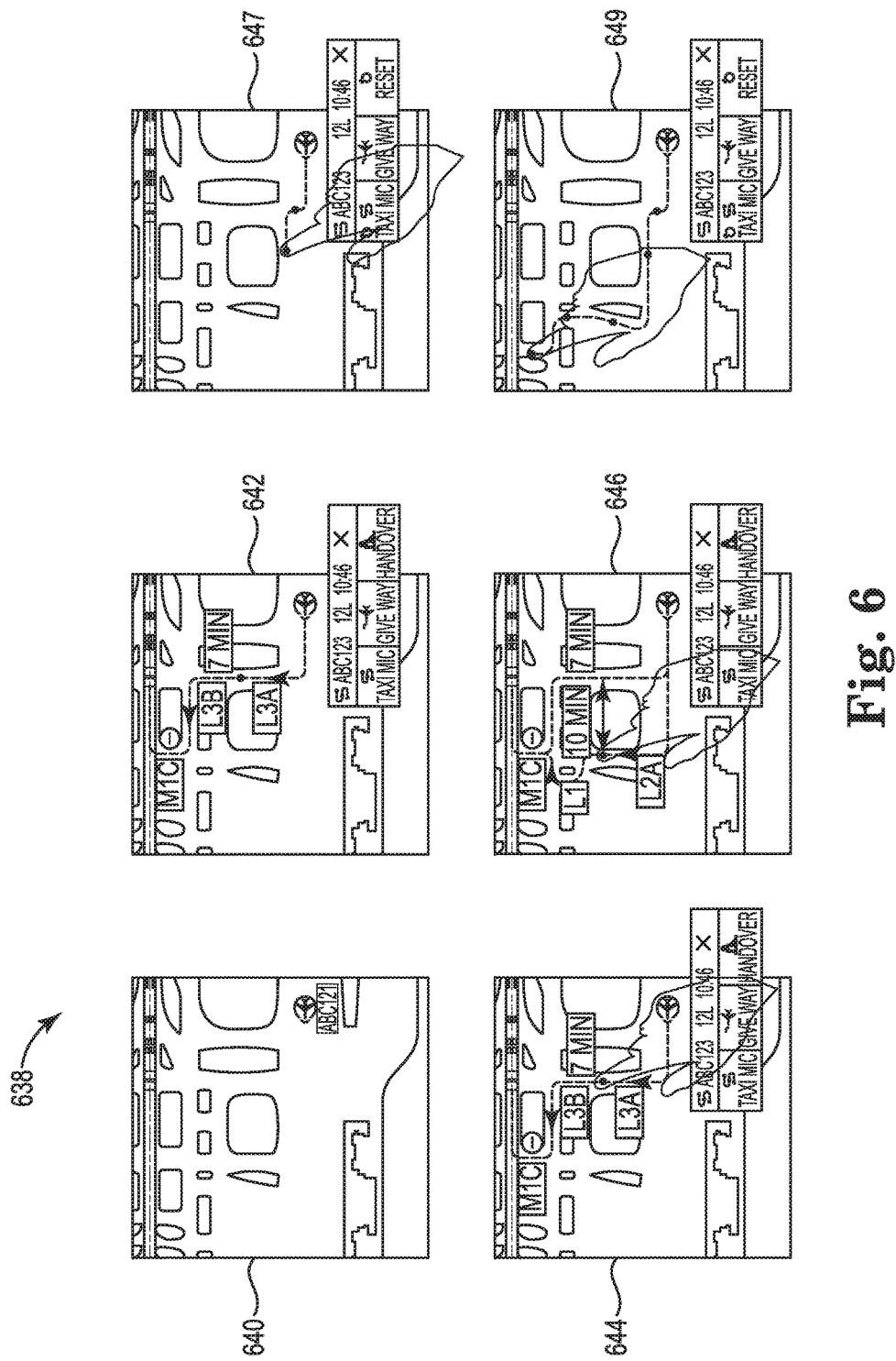
FIG. 6 is an illustration of a display provided on a user interface showing modifying ground routing information, generated in accordance with one or more embodiments of the present disclosure.

FIG. 6 is an illustration of a display provided on a user interface (e.g., user interface 976, as described in connection with FIG. 9) showing modifying ground routing information 638, generated in accordance with one or more embodiments of the present disclosure. As illustrated in FIG. 6, a user may modify the ground routing information of an aircraft on an airport map (e.g., airport map 106, 306, 406, 506, previously described in connection with FIGS. 1, 3, 4, and 5, respectively).

A computing device can generate a ground taxi route for an aircraft at the airport. In some examples, for a departing aircraft, a ground taxi route may need to be generated from the parking stand at which the aircraft is parked to a runway. In some examples, for an arriving aircraft, a ground taxi route may need to be generated from the runway to a parking stand, a parking stand to another different parking stand, an aircraft in a holding position waiting for a parking stand, from a parking stand to a hangar, and/or other various ground taxi routes.

As illustrated in FIG. 6 at 640, an aircraft may be shown on an airport map. An ATC controller can select the aircraft via a user input at 642. Aircraft information and ground routing information may be displayed on the airport map in response to the user input. In some examples, an estimated taxi time may be shown. For instance, as shown at 642, the ground routing information can indicate that the aircraft can take seven minutes to taxi from a first location to a second location.

In some examples, the aircraft information and/or ground routing information may include the point to which the aircraft is taxiing towards, the next holding position of the aircraft, the time of arrival at the next holding position, etc. For example, the aircraft shown in FIG. 6 may be taxiing towards the next holding position at 12L to await further clearance from an ATC controller, and the aircraft's estimated time of arrival at 12L is 10:46.

As illustrated at 647, in some embodiments, an ATC controller may determine the ground routing information for the aircraft via a user input. For example, the ATC controller may select various way-points on the airport map to determine the ground taxi route for the aircraft.

As illustrated at 649, the ATC controller has selected the various way-points on the airport map. The ATC controller can confirm the ground taxi route for the aircraft by selecting "Taxi" included in the menu for the selected aircraft.

As illustrated at 644, the ground routing information for the aircraft may be modified. For example, the ground taxi route for the aircraft may be modified via a user input. In some examples, the user input may be via a touch screen display. As illustrated at 644 and 646, the ATC controller may select a portion of the ground taxi route for the aircraft, and slide the ground taxi route from the original taxi route to a new taxi route, altering the ground taxi route for the aircraft. The estimated taxi time may be revised based on the modified ground routing information. For example, as shown at 646, the revised ground routing information can indicate that the aircraft can take ten minutes to taxi from the first location to the second location.

In some examples, an ATC controller may modify the ground taxi route by drawing a new ground taxi route via a user input. In some examples, an ATC controller may draw on the airport map a desired ground taxi route for the aircraft. In some examples, an ATC controller may select points on the airport map and the computing device can generate a ground taxi route using the selected points.

As illustrated at 644 and 646, the ground taxi route may be shown as a dotted line, indicating a ground taxi route that has not been confirmed by an ATC controller. The ATC controller may confirm (e.g., accept) the ground taxi route, causing the dotted line to become a solid line.

As shown in FIG. 6, the dotted line illustrated at 642, 644, 646, can terminate at an aircraft's next holding position (e.g., 12L, as shown at 642, 644, 646). Although not shown in FIG. 6 for clarity and so as not to obscure embodiments of the present disclosure, the dotted line can be colored (e.g., green) to indicate clearance of the aircraft to taxi along the ground taxi route until the next holding position.

Although an ATC controller may modify the ground taxi route of a selected aircraft on the ATC flight management analysis, the actual ground taxi route of the selected aircraft is not modified. The modified ground taxi route of the aircraft may be transmitted from ATC to a pilot of the selected aircraft for display on a cockpit display of an aircraft or through guidance using taxiway lights.

Figure 7:
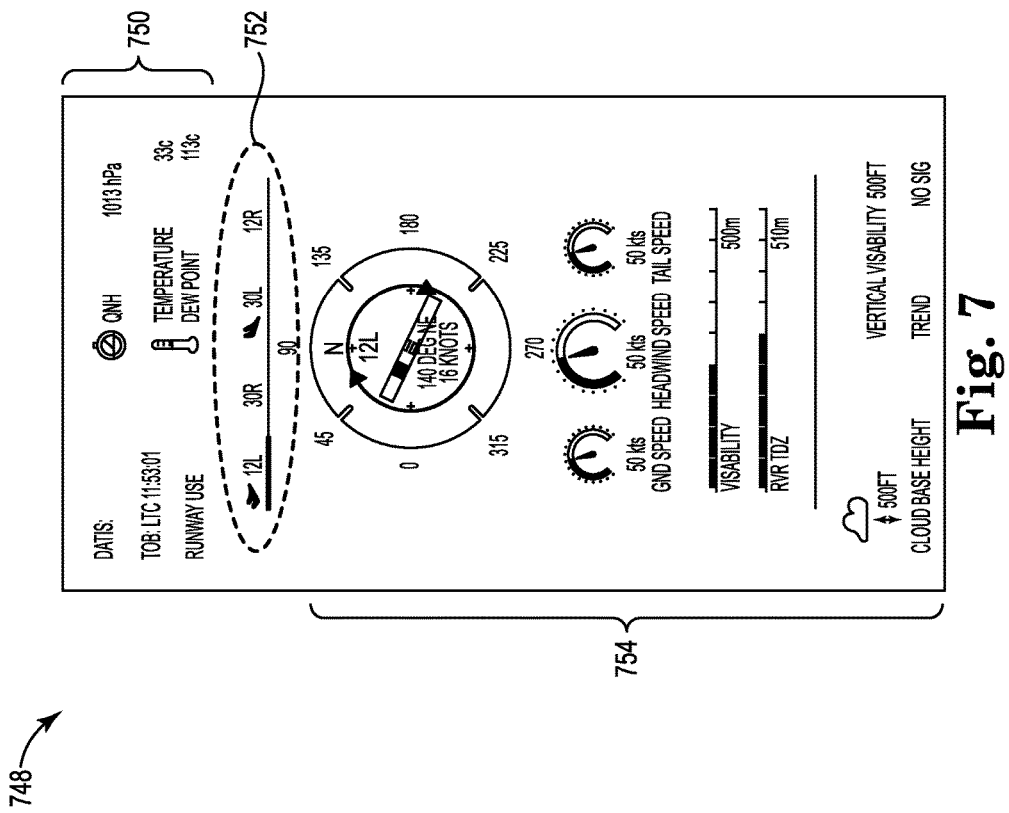
FIG. 7 is an illustration of a display provided on a user interface showing an airport environmental information window, in accordance with one or more embodiments of the present disclosure.

FIG. 7 is an illustration of a display provided on a user interface (e.g., user interface 976, as described in connection with FIG. 9) showing an airport environmental information window 748, generated in accordance with one or more embodiments of the present disclosure. The airport environmental information window 748 can include airport environmental information 750, runway toggle 752, and runway environmental information 754.

The airport environmental information window 748 may be selected by an ATC controller via an airport information header (e.g., airport information header 103, previously described in connection with FIG. 1). The airport environmental information window 748 can display environmental conditions in and around the airport. For example, the airport environmental information window 748 can display environmental conditions applicable to the airport as a whole, and/or environmental conditions applicable to portions of the airport.

Airport environmental information 750 can include environmental conditions applicable to the airport as a whole. For example, airport environmental information 750 for the airport can include the time, temperature, dew point, and/or atmospheric pressure, although airport environmental information 750 is not limited to the above listed environmental information.

Airport environmental information window 748 can include a runway toggle 752. The runway toggle 752 can toggle runway environmental information 754 to be displayed, including environmental conditions specific to runways and/or portions of runways of the airport. Runway environmental information 754 can include a wind speed, including gust speeds, head wind speeds, and tail speeds, wind direction, meteorological visibility, cloud height (e.g., cloud base height), vertical visibility, and trends. For example, as illustrated in FIG. 7, wind speed at runway 12L is indicated as sixteen knots at a direction of one hundred and forty degrees NE, with a visibility of five hundred meters, a cloud base height of five hundred feet, and vertical visibility of five hundred feet.

Runway environmental information 754 for runways 30R, 30L, and/or 12R may also be viewed. For example, a user may select runway environmental information 754 specific to runways 30R, 30L, and/or 12R by selecting, via a user input using runway toggle 752, runways 30R, 30L, and/or 12R.

Figure 8:
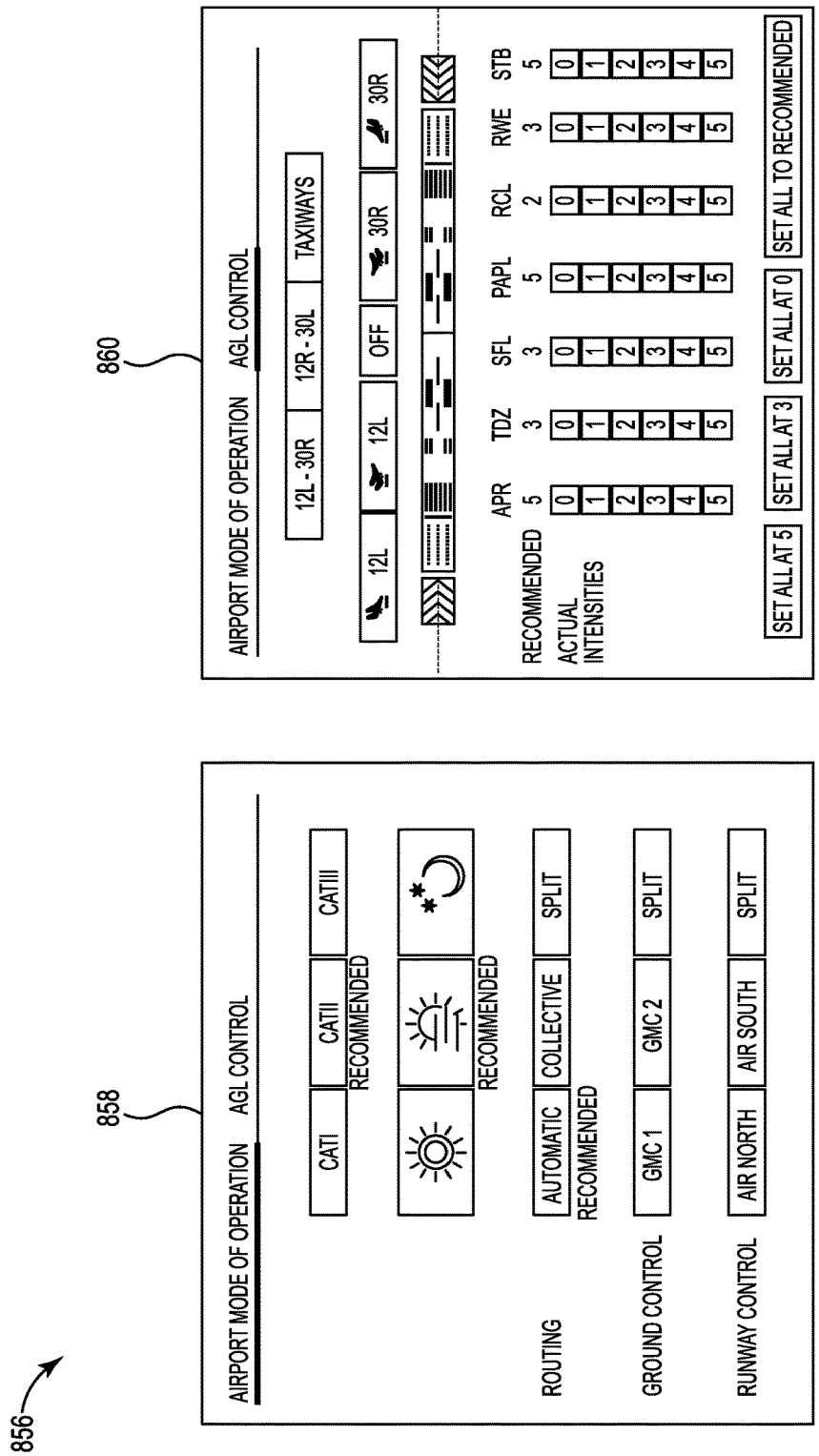
FIG. 8 is an illustration of a display provided on a user interface showing airport operating mode control windows, in accordance with one or more embodiments of the present disclosure.

FIG. 8 is an illustration of a display provided on a user interface (e.g., user interface 976, as described in connection with FIG. 9) showing airport operating mode control windows 856, generated in accordance with one or more embodiments of the present disclosure. Airport operating mode control windows 856 can include operation mode toggles 858 and lighting control toggles 860.

Operation mode toggles 858 can include airport control parameters an ATC controller may modify. For example, an ATC controller may modify daytime, nighttime, and/or twilight operation settings, routing settings, ground control settings, and/or runway control settings.

Although not shown in FIG. 8 for clarity and so as not to obscure embodiments of the present disclosure, operation mode toggles 858 are not limited to the above listed control parameters. For example, an ATC controller may modify areas of responsibility of the ATC controller and/or other ATC controllers, enable and/or disable areas of restriction on an airfield, approval and/or denial of maintenance requests for navigational aids and/or other systems at the airport, meteorological and/or weather related information, and/or operating modes, among other airport control parameters.

Lighting control toggles 860 can include airport ground lighting control settings an ATC controller may modify. As shown in FIG. 8, airport ground lighting can be monitored. For example, an ATC controller may modify the lighting for various runways and/or taxiways at the airport and/or other lighting.

Modifying airport ground lighting can include modifying an intensity of airport ground lighting. For example, an ATC controller can decrease an intensity of runway lighting during twilight or nighttime operation of the airport, and increase the intensity of runway lighting during daytime operation of the airport. Modification of airport ground lighting can be in response to an input from the ATC controller.

Figure 9:
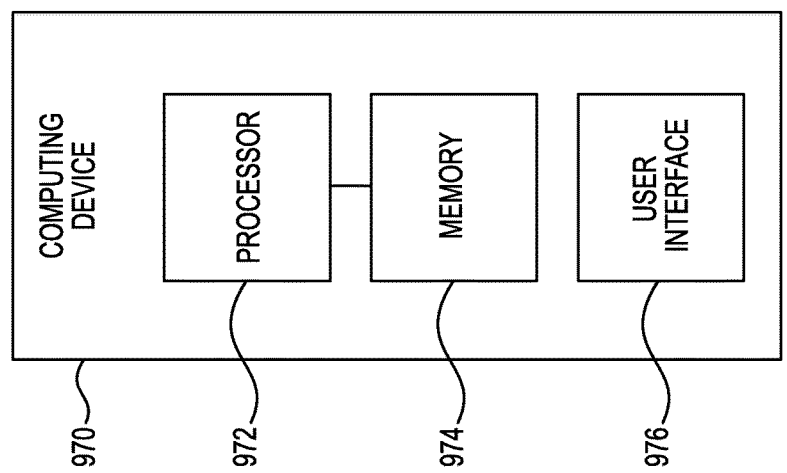
FIG. 9 is a computing device for air traffic control flight management, in accordance with one or more embodiments of the present disclosure.

FIG. 9 is a computing device 970 for air traffic control flight management, in accordance with one or more embodiments of the present disclosure. As illustrated in FIG. 9, computing device 970 can include a user interface 976, memory 974 and a processor 972 to generate an ATC flight management analysis in accordance with the present disclosure.

Computing device 970 can be, for example, a laptop computer, a desktop computer, and/or a mobile device (e.g., a smart phone, tablet, personal digital assistant, smart glasses, a wrist-worn device, etc.), and/or redundant combinations thereof, among other types of computing devices.

The memory 974 can be any type of storage medium that can be accessed by the processor 972 to perform various examples of the present disclosure. For example, the memory 974 can be a non-transitory computer readable medium having computer readable instructions (e.g., computer program instructions) stored thereon that are executable by the processor 972 to generate an ATC flight management analysis in accordance with the present disclosure. The computer readable instructions can be executable by the processor 972 to redundantly generate the ATC flight management analysis.

The memory 974 can be volatile or nonvolatile memory. The memory 974 can also be removable (e.g., portable) memory, or non-removable (e.g., internal) memory. For example, the memory 974 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

Further, although memory 974 is illustrated as being located within computing device 970, embodiments of the present disclosure are not so limited. For example, memory 974 can also be located internal to another computing resource (e.g., enabling computer readable instructions to be downloaded over the Internet or another wired or wireless connection).

As illustrated in FIG. 9, computing device 970 includes a user interface 976. For example, the user interface 976 can display ATC flight management analysis (e.g., as previously described in connection with FIGS. 1-8) in a single integrated display. A user (e.g., operator) of computing device 970, such as an ATC controller, can interact with computing device 970 via user interface 976. For example, user interface 976 can provide (e.g., display and/or present) information to the user of computing device 970, and/or receive information from (e.g., input by) the user of computing device 970. For instance, in some embodiments, user interface 976 can be a graphical user interface (GUI) that can provide and/or receive information to and/or from the user of computing device 970. The display can be, for instance, a touch-screen (e.g., the GUI can include touch-screen capabilities). Alternatively, a display can include a television, computer monitor, mobile device screen, other type of display device, or any combination thereof, connected to computing device 970 and configured to receive a video signal output from the computing device 970.

As an additional example, user interface 976 can include a keyboard and/or mouse the user can use to input information into computing device 970. Embodiments of the present disclosure, however, are not limited to a particular type(s) of user interface.

User interface 976 can be localized to any language. For example, user interface 976 can display the ATC flight management analysis in any language, such as English, Spanish, German, French, Mandarin, Arabic, Japanese, Hindi, etc.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for air traffic control flight management, comprising:
    a memory;
    a processor configured to execute executable instructions stored in the memory to:
        receive airport information associated with an airport;
        generate, using the airport information, a card panel including a number of flight cards, wherein each respective one of the number of flight cards corresponds to a different respective aircraft at the airport; and
    a user interface configured to display the card panel in a timeline view from a separation view in a single integrated display.

2. The computing device of claim 1, wherein the number of flight cards of the card panel are organized by arriving aircraft and departing aircraft in chronological order in the timeline view.

3. The computing device of claim 1, wherein each respective one of the number of flight cards includes a flight call sign corresponding to its respective one of the aircraft at the airport.

4. The computing device of claim 1, wherein each respective one of the number of flight cards includes an aircraft type corresponding to its respective one of the aircraft at the airport.

5. The computing device of claim 1, wherein each respective one of the number of flight cards includes ground routing information corresponding to its respective one of the aircraft at the airport.

6. The computing device of claim 1, wherein each respective one of the number of flight cards includes at least one of a departure airport and a destination airport corresponding to its respective one of the aircraft at the airport.

7. The computing device of claim 1, wherein each respective one of the number of flight cards includes an action indicator corresponding to its respective one of the aircraft at the airport.

8. The computing device of claim 1, wherein each respective one of the number of flight cards includes color coding information corresponding to its respective one of the aircraft at the airport.

9. The computing device of claim 1, wherein the card panel includes an arrival card panel having a number of flight cards, wherein each respective one of the number of flight cards of the arrival card panel corresponds to a different respective aircraft arriving at the airport.

10. The computing device of claim 1, wherein the card panel includes a departure card panel having a number of flight cards, wherein each respective one of the number of flight cards of the departure card panel corresponds to a different respective aircraft departing the airport.

11. A non-transitory computer readable medium having computer readable instructions stored thereon that are executable by a processor to:
    receive airport information associated with an airport;
    generate, using the airport information, a card panel including a number of flight cards, wherein:
        each respective one of the number of flight cards corresponds to a different respective aircraft at the airport;
        the card panel includes an arrival card panel including a number of flight cards corresponding to an aircraft arriving at the airport; and
        the card panel includes a departure card panel including a number of flight cards corresponding to an aircraft departing the airport; and
    display the card panel in a clearance status view from a separation view in a single integrated display.

12. The non-transitory computer readable medium of claim 11, wherein the processor is configured to execute the instructions to group the number of flight cards of the card panel based on clearance status of each of the aircraft at the airport in the clearance status view.

13. The non-transitory computer readable medium of claim 12, wherein the processor is configured to execute the instructions to cause a flight card among the number of flight cards to be re-grouped based on a change in the clearance status of the aircraft at the airport corresponding to the flight card.

14. The non-transitory computer readable medium of claim 11, wherein the aircraft departing the airport are associated with clearance statuses including at least one of:
    pushback clearance;
    ground taxi clearance;
    handover;
    crossing clearance;
    line up clearance; and
    take off clearance.

15. The non-transitory computer readable medium of claim 11, wherein the aircraft arriving at the airport are associated with clearance statuses including at least one of:
    awaiting landing clearance;
    landing clearance;
    handover;
    crossing clearance; and
    ground taxi clearance.

16. A computer implemented method for air traffic control flight management, comprising:
    receiving, by a computing device, airport information associated with an airport;
    generating, by a computing device using the airport information, a card panel including a number of flight cards, wherein each respective one of the number of flight cards corresponds to a different respective aircraft at the airport; and
    displaying, on a user interface of the computing device, the card panel in a separation view in a single integrated display.

17. The method of claim 16, wherein the method includes grouping the number of flight cards of the card panel based on a sub-group of the aircraft at the airport reaching a common point of convergence in the separation view.

18. The method of claim 17, wherein the method includes prioritizing the sub-group of the aircraft at the airport based on an aircraft of the sub-group of the aircraft exceeding a threshold distance between other aircraft of the sub-group of the aircraft at the airport.

19. The method of claim 16, wherein the method includes:
    generating a menu for a flight card of the number of flight cards in response to a selection of the flight card via a user input; and
    sending an instruction to the aircraft at the airport to change a ground taxi route of the aircraft in response to the user input via the menu.

20. The method of claim 16, wherein the method includes color coding an action indicator included on a flight card of the number of flight cards in response to a sub-group of the aircraft at the airport that includes the aircraft corresponding to the flight card reaching a common point of convergence in the separation view.

\* \* \* \* \*